Oct. 20, 1931.　　J. J. ROOT, JR　　1,827,911
VALVE
Filed Aug. 16, 1927
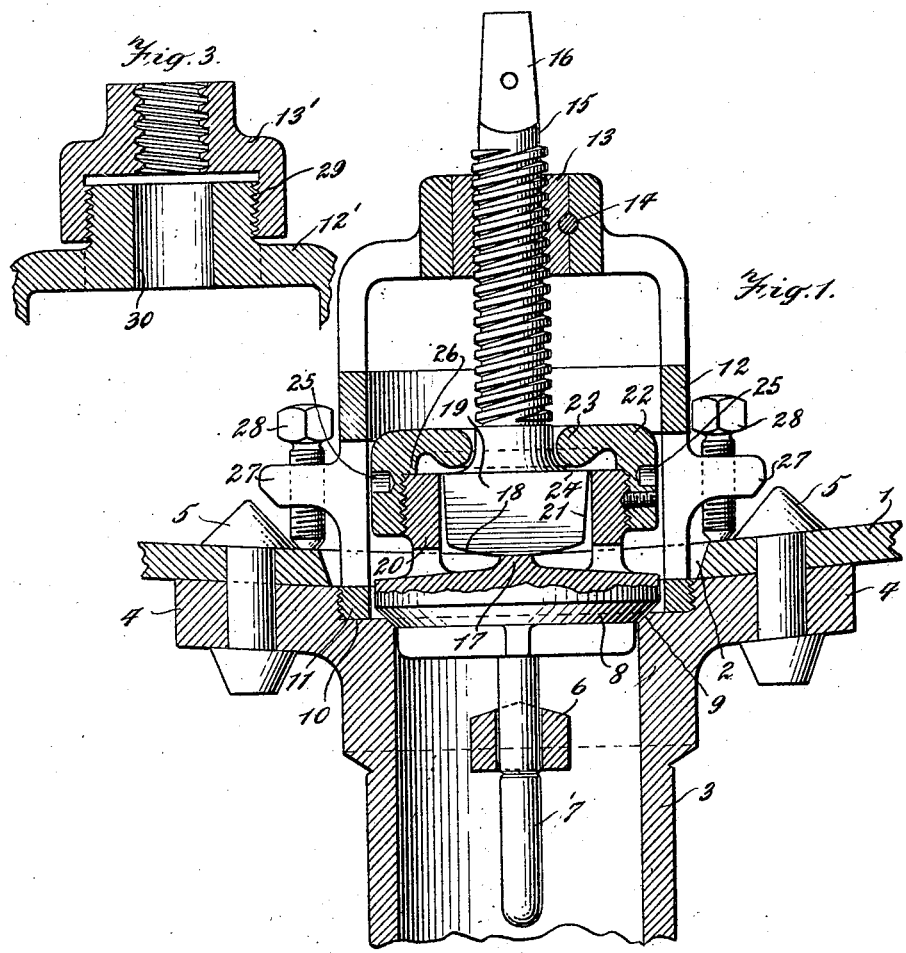
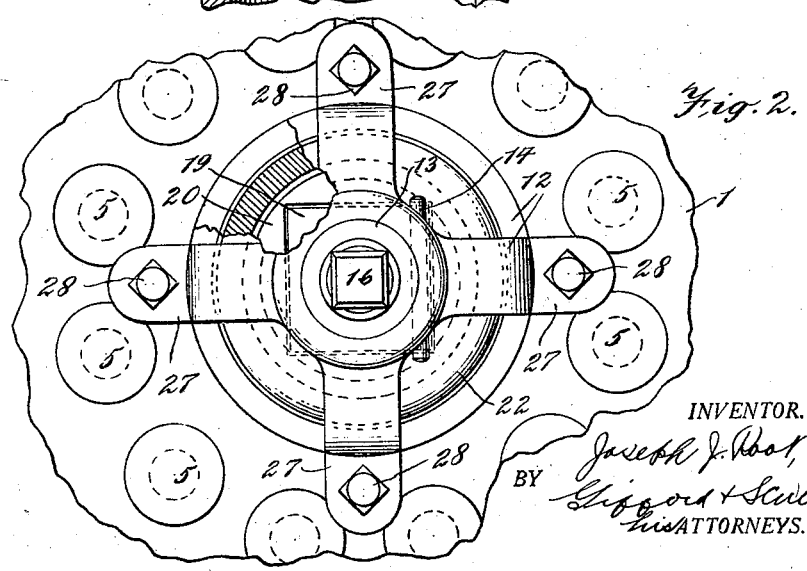
INVENTOR.
Joseph J. Root, Jr.,
BY Gifford & Scull
his ATTORNEYS.

Patented Oct. 20, 1931

1,827,911

UNITED STATES PATENT OFFICE

JOSEPH J. ROOT, JR., OF CHICAGO, ILLINOIS

VALVE

Application filed August 16, 1927. Serial No. 213,323.

This invention relates to a novel and improved valve, and more particularly to a valve adapted for use at the outlet of a container. While it is not so limited, I shall describe it as employed with the outlet of a tank car.

The invention will be best understood from the following description and the accompanying drawings, in which:—

Fig. 1 is a longitudinal sectional view through a device embodying my invention.

Fig. 2 is a plan view of the device as it appears in Fig. 1.

Fig. 3 is a fragmentary sectional view on the same plane as Fig. 1, but showing a modified form of nut for the operating stem.

In the selected embodiment which I have illustrated, the invention is shown as applied to a container, exemplified by a tank having its wall 1 formed of the usual sheet, and this wall is provided with an opening 2. Surrounding the opening on the outer side of the wall, is a casing 3 having a flange 4 secured to the wall as by rivets 5.

The casing is provided with a transversely extending bridge 6 forming a guide, in which is slidably mounted a guiding member 7 secured to a valve 8 which coacts with a valve seat 9 on the casing. The casing 3 is provided with a recess 10 surrounding the valve 8 and received within this recess is a ring 11 which is threaded into engagement with the wall of the recess, as shown. This ring is part of a cage 12 which carries a nut 13 secured in position as by a dowel pin 14. Threaded through the nut is the operating stem 15 for the valve, this stem being provided with a shank 16 suitably shaped to engage a rod or the like by which it may be operated from the top of the tank, as is customary in tank cars. It will of course be understood that when the valve is used in other locations, equivalent operating means may be employed.

The valve 8 is provided with a relatively small projection 17 having a curved face adapted to contact with a corresponding curved surface 18 on the head 19 of the stem. The valve is also provided with a box 20 in which is received the head 19, and it will be seen that the top of the head has its edges lying in substantially the same plane as the top edges of box, and that the head is provided with inclined or tapered sides 21, and these sides are spaced from the inner walls of the box 20. The head and the box may be of any desired shape in cross-section, so long as the walls of the box are spaced from the sides of the head, but are preferably square, as shown in Fig. 2. By providing the head with the tapered portion, I eliminate the necessity of machining the valve seat with the same accuracy as would otherwise be necessary. It is possible to have the stem and the valve out of alinement to a considerable degree, without affecting the operation of the device.

This construction permits relative movement between the valve and the stem which operates it. The stem is loosely held in operative position with respect to the valve, by means of a nut 22 threaded on the box and having an annular flange 23 adapted to engage the shoulder 24 on the head. The nut is provided with openings 25 for the reception of a spanner wrench, and may be secured by a set screw, as shown.

The movement of the nut on the box is limited by means of a shoulder 26 disposed on the flange and adapted to contact with the top edge of the box. The cage cooperates with the nut 22 to guide the valve in its movements to and from its seat.

The cage is provided with a plurality of outwardly extending ears 27, each provided with a set screw 28 adapted to contact with the inner surface of the wall 1. This arrangement prevents the cage from becoming loosened and provides a simple and efficient means for locking it in position. Moreover, this arrangement provides additional means for holding the flange 4 against the wall 1, although the rivets are ordinarily sufficient for that purpose. The cage is preferably of skeleton form, as shown, whereby openings are provided to insure proper drainage.

By the above construction it will be seen that I have provided a valve of simple and efficient construction and one in which the valve is free to seat itself independently of the operating stem. The stem will hold the valve against its seat regardless of the position which the container may take, it not being necessary to have the stem and valve remain vertical. Even though the stem should be displaced laterally, this displacement will not affect the valve so long as the head 19 is in engagement with the projection 17.

It will be noted that the engagement between the head and projection is a substantially one point contact so as to permit free relative movement between these two parts in a lateral direction.

The construction shown provides for a self-wiping of the valve and the seat. Preferably, the head 19 is non-circular in cross section, and the box 20 is of a similar form as shown in Fig. 2, so that rotation of the stem will also cause rotation of the box and consequently of the valve. Therefore, it will be seen that rotation of the stem, whenever the valve is operated, will cause a wiping action between the cooperating faces of the valve and the seat.

It will be noted that the flange 23 is spaced from the shoulder 24 of the head 19, when the valve is in closed position, as shown in Fig. 1. Therefore the valve will be rotated on its seat by rotation of the stem 15 without being lifted, when the stem is first rotated to open the valve. Then as the rotation of the stem continues, the shoulder 24 will engage the flange 23 and lift the valve from its seat. Until such engagement takes place, the valve will be rotated on its seat without substantial pressure on the seat, thus wiping the seat. The same action takes place when the valve is being seated, the valve rotating without exerting substantial pressure on the seat until the head 19 firmly engages the valve and forces it against the seat. The amount of this rotation of the valve may be adjusted by changing the distance between the flange 23 and the shoulder 24.

When it is desired to re-grind the valve seat, in addition to the wiping which it gets in ordinary use, the cage 12 may be readily removed after loosening of the set screws 28, merely by unscrewing the cage from the casing 3. Or, if it is not desired to remove the casing, the construction shown in Fig. 3 may be adopted, in which the nut 13 is replaced with the nut 13'. It will be noted that this nut 13' is removable from the cage 12' to which it is secured by threaded engagement, indicated at 29.

The cage or the nut 13', as the case may be, is removed and then a suitable grinding compound may be applied to the valve seat, and the valve may be rotated back and forth on the seat to perform the grinding operation, the operator exerting the desired pressure on the stem. This would not be possible with the nut in engagement with the stem, because then a rotation of the stem would cause lifting of the head out of engagement with the valve as well as rotation thereof. The aperture 30 in the top of the cage 12' serves as a guide for the stem 15, after removal of the nut, and this guide maintains the stem in proper position for grinding the valve seat.

By situating the valve seat on the casing, which is tightly riveted to the wall of a container, the danger of leakage is greatly reduced. The only surface along which leakage may take place is the surface of the valve seat, whereas if the seat were disposed in the cage, it would also be necessary to provide a tight joint at the threaded engagement between the cage and the casing.

While I have shown a selected embodiment of my invention, I have done so merely for the purpose of illustration, and I do not intend to limit myself except by the appended claims.

I claim:—

1. In a device of the class described, a valve casing having a seat therein, a valve adapted to contact with said seat and having a relatively small projection thereon, a cage rigidly secured to said casing and supporting a nut in fixed position therein, a stem threaded to said nut and having a curved head contacting with said projection on said valve, means loosely holding said head in engagement with said projection, and means to transmit rotation of the head to the valve.

2. In a device of the class described, a container wall having an opening therein, a valve seat adjacent said opening, a cage secured to said wall, a valve cooperating with said seat, a nut carried by said cage, a stem threaded through said nut and having a curved head engaging said valve, a box disposed on said valve and adapted to receive said head, with the walls of said box spaced from the head, a member secured on said box and having a flange loosely engaging said head to prevent its removal from said box, and means to prevent rotation of said head in the box.

3. In a device of the class described, a container wall having an opening therein, a valve seat adjacent said opening, a cage secured to said wall, a valve cooperating with said seat, a nut carried by said cage, a stem threaded through said nut and having a head integral therewith and engaging said valve, the engaging parts on said head and on said valve having a convex surface on one and a relatively small projection on the other, and means to transmit rotation of the head to the valve.

4. In a device of the class described, a valve seat and a valve adapted to cooperate therewith, a box on said valve and having a plurality of substantially straight sides, a stem having a head received in said box, said head having sides vertically tapered with respect to the sides of the box, but having a portion of each side of the head substantially parallel to an adjacent portion of the adjacent side of the box to cause rotation of the valve upon rotation of the stem, and contacting surfaces on the head and valve, one surface being curved, whereby the valve may be rotated by the stem but may rock with respect thereto, and means to operate the stem to bring the valve into and out of engagement with the seat.

5. In a device of the class described, a valve seat and a valve adapted to cooperate therewith, a box on said valve and having a plurality of substantially straight sides, a stem having a head received in said box, said head having sides vertically tapered with respect to the sides of the box, but having a portion of each side of the head substantially parallel to an adjacent portion of the adjacent side of the box to cause rotation of the valve upon rotation of the stem, contacting surfaces on the head and valve, one surface being curved, whereby the valve may be rotated by the stem but may rock with respect thereto, means to operate the stem to bring the valve into and out of engagement with the seat, and a member secured on said box and having a flange overhanging said head but spaced therefrom to retain the head in the box while permitting limited movement of the valve lengthwise of the stem.

6. In a device of the class described, a valve seat and a valve adapted to cooperate therewith, a stem having a head adapted to engage said valve, a fixed member in threaded engagement with said stem, whereby rotation of the stem may move the valve to and from its seat, means preventing rotation of the head with respect to the valve, and means on the valve overlying the head to prevent separation of the head and valve but permitting limited movement of the head with respect to the valve longitudinally of the stem, the head and valve having contacting surfaces, one of which is curved, thereby permitting rocking movement of the valve with respect to the head.

7. In a device of the class described a valve seat and a valve adapted to cooperate therewith, a box on said valve and having a plurality of substantially straight sides, a stem having a head received in said box, said head having a curved surface and said valve having a small central projection contacting with said curved surface on the head, said head having sides with portions substantially parallel to the adjacent sides of the box horizontally, but said sides of the head being tapered with respect to the adjacent sides of the box vertically and adapted to cooperate therewith to cause rotation of the valve upon the rotation of the stem, whereby the valve may be rotated by the stem, but may rock with respect thereto, and means to operate the stem to bring the valves into and out of engagement with the seat.

8. In a device of the class described, a valve seat and a valve adapted to cooperate therewith, a polygonal box on said valve, a stem having a polygonal head loosely received in said box and having a curved surface engaging said valve, the sides of said head having portions thereof parallel to the adjacent portions of the sides of the box, but spaced a slight distance therefrom to permit rocking movement between the head and the valve on said curved surface, a small projection on the valve engaging the central portion of the head, means to operate said stem to bring said valve into and out of engagement with said seat and means loosely holding the head in the box.

9. In a device of the class described, a valve seat and a valve adapted to cooperate therewith, a polygonal box on said valve, a stem having a polygonal head loosely received in said box and having a curved surface engaging said valve, the sides of said head having portions thereof parallel to the adjacent portions of the sides of the box, but spaced a slight distance therefrom to permit rocking movement between the head and the valve on said curved surface, means to operate said stem to bring said valve into and out of engagement with said seat, and means loosely holding the head in the box.

10. In a device of the class described, a valve seat and a valve adapted to cooperate therewith, a polygonal box on said valve, a stem having a polygonal head loosely received in said box and having a curved surface engaging said valve, the sides of said head having portions thereof parallel to the adjacent portions of the sides of the box, but spaced a slight distance therefrom to permit rocking movement between the head and the valve on said curved surface, a small projection on the valve engaging the central portion of the head, the sides of said head being tapered vertically with respect to the sides of the box, means to operate said stem to bring said valve into and out of engagement with said seat, and means loosely holding the head in the box.

JOSEPH J. ROOT, Jr.